Dec. 5, 1950 H. J. TSCHOHL ET AL 2,532,380
TRACTION GRIP
Filed Oct. 30, 1946
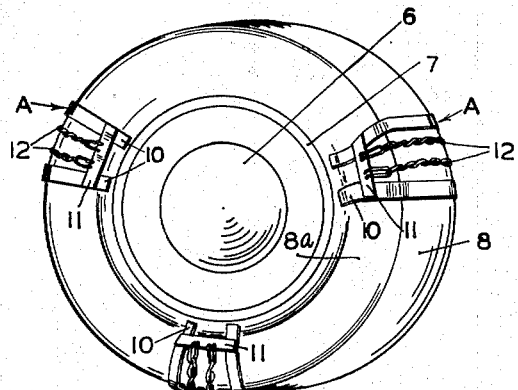
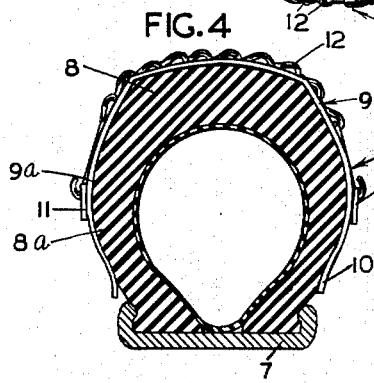
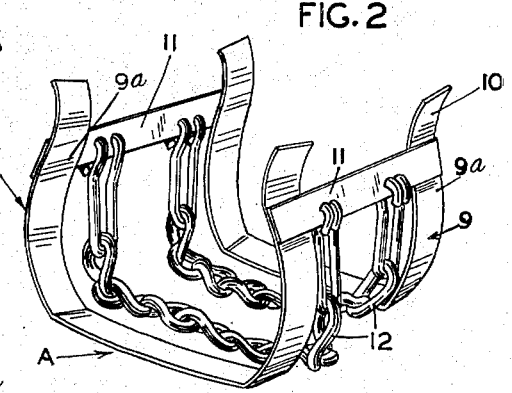
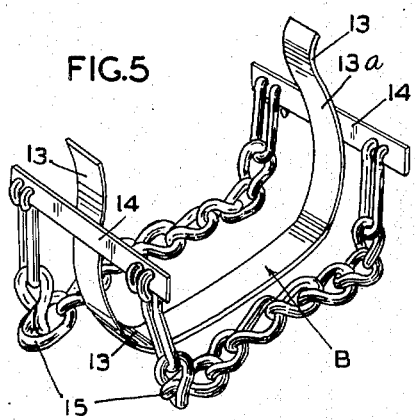
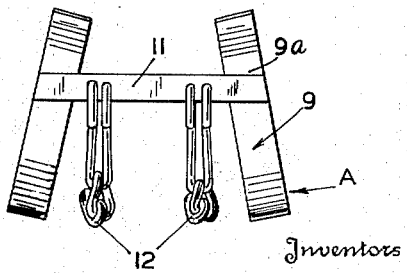
Inventors
HARRY J. TSCHOHL
EARL M. HANSON
By Williamson & Williamson
Attorneys Patented Dec. 5, 1950

2,532,380

UNITED STATES PATENT OFFICE 2,532,380

TRACTION GRIP

Harry J. Tschohl and Earl M. Hanson, Mankato, Minn.

Application October 30, 1946, Serial No. 706,626

1 Claim. (Cl. 152—223)

This invention relates to traction grips for automobile tires.

The usual type of traction grip takes a strap-on form which completely transversely encircles the tire and rim of a wheel, being applied between the spokes or through small openings left adjacent to the rim in most of the modern wheels which are of the disc type. Attaching these strap-on traction grips is entirely impossible if these openings are omitted as in the construction of certain full disc-type wheels. Also attaching these old type strap-on traction grips is a tedious, difficult, and dirty job on the modern automobile, which has very limited ground clearance and limited clearance between the tire periphery and the fender and has small, narrow openings adjacent to the rim through which the said strap must be threaded.

It is an object of the present invention to provide a novel and improved traction grip of cheap and simple construction which can be easily clipped onto a tire casing mounted on any type wheel including a full disc-type wheel.

The objects of the invention will more fully appear from the following description made in connection with the accompanying drawings wherein like reference characters refer to the same or similar parts throughout the various views and in which:

Fig. 1 is a general perspective view illustrating a number of traction grips made in accordance with one embodiment of the invention as applied on a tire casing, mounted on a wheel.

Fig. 2 is a perspective view illustrating a traction grip of the type shown in Fig. 1.

Fig. 3 is a side elevation of the same traction grip.

Fig. 4 is a cross-sectional view taken through a tire equipped automobile rim showing the same traction grip applied about the tire casing; and Fig. 5 is a perspective view showing an alternative form of traction grip of the invention.

There is shown in the drawings an automobile wheel 6 having a flanged rim 7 and having applied thereto a tire casing 8.

For use in obtaining additional traction for the tire casing 8, there is provided, in accordance with the form of the invention illustrated in Figs. 1 to 4 inclusive, a traction grip designated as an entirety by the letter A. This traction grip is in the form of two spring clips 9 made as from spring strap steel and having a U-shaped form to closely embrace the tire casing 8 and having spring arms 9a provided with outturned, flared end portions 10. The arms 9a of the clips 9 are adapted to tightly and resiliently embrace the side walls 8a of the tire casing 8, the arms 9a of the tire clips 9 being of such length as to terminate substantially adjacent the rim 7. Attached to the arms 9a of these two spring clips are two cross-members 11 made as from strap steel. These cross-members 11 serve both to hold the spring clips in a radially converging position and to provide an anchor for the ends of traction cross chains 12. Attached by their ends to said cross-members 11 are two traction cross chains 12, which are adapted to fit about and tightly embrace the tire casing 8.

For use in obtaining additional traction for said tire casing 8, the said traction grip A is merely snapped over the tire casing 8, the diverging flared end portions 10 of the clips 9 permitting of ready attachment. When the grip A is thus applied, the arms 9a of the clips 9 extend along radii of the wheel 6, and the traction chains 12 and clips 9 are held tightly about the tire casing 8 solely by the frictional force exerted between the arms 9a of the spring clips 9 and the side walls 8a of the tire casing 8. More than one of these traction grips A can be attached to tire casing 8 to obtain still more traction. The spring pressure of the arms 9a of the clips 9 gripping the tire cause the clips to maintain their position on the tire against centrifugal force even when the wheel equipped with the grip A is driven at high speed.

There is shown in Fig. 5 an alternative form of traction grip, designated as an entirety by the letter B, which may be employed in place of the traction grip A.

Traction grip B is in the form of a single spring clip 13 of the same shape and material as used for the clips 9 of the traction grip A. Attached to the arms 13a of the spring clip 13 are two cross-members 14, one attached to each arm 13a of said clip 13, and these cross members extend laterally well beyond the sides of the arms 13a. Near the ends of said cross members 14, the ends of the traction chains 15 are attached and anchored, the chains 15 being similar to the traction chains 12 used in traction grip A.

The operation of said traction grip B is quite similar to that of traction grip A except that the traction grip B is held tightly about tire casing 8 by only a single spring clip 13 instead of by double spring clips 9 as in the case of traction grip A.

It will be seen that an effective traction grip has been provided in either type A or type B which will eliminate a considerable portion of the labor required in attaching a traction device about only a part of the periphery of a tire casing.

It will be understood that changes may be made in the form, details, arrangement, and proportions of the various parts without departing from the scope of the present invention, which generally stated consists in the matter shown and described and set forth in the appended claim.

What is claimed is:

A traction grip comprising two spaced substantially U-shaped individual spring clips adapted to resiliently embrace a tire casing mounted on a wheel, each clip including an intermediate portion and a pair of opposed spring clamping arms integrally formed therewith and said arms forming the sole clamping means for holding said traction grip on said tire casing, the adjacent arms of the respective clips converging inwardly so that when applied the arms of the clips extend radially relative to the wheel, cross-members extending between adjacent arms of the two clips and connecting the same, said cross-members holding said clips in said radial convergent position, and a flexible traction element, the ends of which are anchored to the said cross-members, said flexible traction element being adapted to fit about the tire casing.

HARRY J. TSCHOHL.
EARL M. HANSON.

REFERENCES CITED

The following references are of record in the file of this patent:

UNITED STATES PATENTS

| Number | Name | Date |
| --- | --- | --- |
| 559,958 | Terry | May 12, 1896 |
| 1,101,198 | Lashar | June 23, 1914 |
| 2,119,447 | Stahl et al. | May 31, 1938 |
| 2,154,047 | Krider | Apr. 11, 1939 |
| 2,315,838 | Bryon | Apr. 6, 1943 |